(12) United States Patent
Xie et al.

(10) Patent No.: US 10,171,637 B2
(45) Date of Patent: Jan. 1, 2019

(54) MOBILE APPARATUS

(71) Applicant: Wuhan China Star Optoelectronics Technology Co., Ltd., Wuhan, Hubei (CN)

(72) Inventors: Lulu Xie, Guangdong (CN); Gonghua Zou, Guangdong (CN); Bin Xiong, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 145 days.

(21) Appl. No.: 15/305,328

(22) PCT Filed: Sep. 14, 2016

(86) PCT No.: PCT/CN2016/098940
§ 371 (c)(1),
(2) Date: Oct. 19, 2016

(87) PCT Pub. No.: WO2018/018721
PCT Pub. Date: Feb. 1, 2018

(65) Prior Publication Data
US 2018/0205810 A1    Jul. 19, 2018

(30) Foreign Application Priority Data
Jul. 29, 2016   (CN) .......................... 2016 1 0614181

(51) Int. Cl.
G06F 3/045      (2006.01)
H04M 1/02       (2006.01)
G06F 3/044      (2006.01)

(52) U.S. Cl.
CPC .......... *H04M 1/0266* (2013.01); *G06F 3/044* (2013.01); *H04M 2201/38* (2013.01); *H04M 2250/22* (2013.01)

(58) Field of Classification Search
CPC ......... H04M 1/0266; H01L 2251/5384; H01L 2251/155; H01L 51/0059; H01L 51/0072; H01L 51/0085; G06F 3/044
See application file for complete search history.

(56) References Cited

U.S. PATENT DOCUMENTS

2002/0033020 A1   3/2002  Tonomura et al.
2013/0265272 A1   10/2013 Li et al.
(Continued)

FOREIGN PATENT DOCUMENTS

CN    201412740 Y    2/2010
CN    203909763 U    10/2014
(Continued)

*Primary Examiner* — Tuan Pham
(74) *Attorney, Agent, or Firm* — Andrew C. Cheng

(57) ABSTRACT

The present application discloses a mobile apparatus includes a light emitting unit, a touch sensor unit, a display panel and a control circuit; wherein the light emitting unit providing backlight to the display panel, the touch sensor unit is disposed on the light emitting unit and electrically connected to the control circuit. The present application is by disposing the touch sensor unit on the light-emitting unit and electrically connected to the control circuit, so that the mobile apparatus does not need to additional provide a FPC need to be adhesive to the cover plate to dispose the touch sensor unit, to save the cost and eliminate the adhesion process.

6 Claims, 2 Drawing Sheets

(56) References Cited

U.S. PATENT DOCUMENTS

2014/0191220 A1* 7/2014 Watabe ............... H01L 51/0072
257/40
2016/0170250 A1 6/2016 Ghali et al.

FOREIGN PATENT DOCUMENTS

| CN | 104699343 A | 6/2015 |
| CN | 205139520 U | 4/2016 |
| CN | 205139874 U | 4/2016 |
| CN | 205155754 U | 4/2016 |

* cited by examiner

MOBILE APPARATUS

FIELD OF THE INVENTION

The present application relates to a terminal technology field, and more particularly to a mobile apparatus.

BACKGROUND OF THE INVENTION

With the development of mobile phone industry, touch screen mobile phone has been widely applied, users can realize the function of the independent button by the method of forming capacitance by touching sensor pattern by user's finger and the touch sensor unit in the mobile phone.

For touch sensor unit in the touch mobile phone, in the conventional technology, the touch sensor unit is formed on the separate FPC in a more common practice, then the FPC is adhesion on the cover plate. In this approach, an additional FPC is needed to be provided, and it need to adhesive the FPC to the cover plate with high costs, and increase the adhesion process.

SUMMARY OF THE INVENTION

The present application provides a mobile apparatus, in order to solve the problem in the touch device to dispose the touch sensor unit on the additional FPC with high costs, and increase the adhesion process.

In order to solve the technology problem above, a technology approach adapted in the present application is providing a mobile apparatus, including: a light emitting unit, a touch sensor unit, a display panel and a control circuit; wherein the light emitting unit providing backlight to the display panel, the touch sensor unit is disposed on the light emitting unit and electrically connected to the control circuit;
the light emitting unit including a first FPC and a light source, the first FPC is in a T shape and includes a horizontal portion and a vertical portion, the horizontal portion includes a first surface and a second surface, the touch sensor unit is disposed on the first surface, the light emitting unit is disposed on the second surface;
a backlight plate, the horizontal portion is adhesion to the backlight plate and makes the first FPC and the backlight plate is relatively fixed;
a second FPC, the second FPC is relatively fixed to the display panel, the second FPC is connected to the vertical portion, a peripheral circuits is disposed on the second FPC, and the peripheral circuits is electrically connected to the control circuit.
wherein the mobile apparatus further including an integrated circuit, the integrated circuit and the display panel is relatively fixed, an input terminal of the integrated circuit is electrically connected to the peripheral circuit, an output terminal of the integrated circuit is electrically connected to the display panel.

In order to solve the technology problem above, a technology approach adapted in the present application is providing a mobile apparatus, including: a light emitting unit, a touch sensor unit, a display panel and a control circuit; wherein the light emitting unit providing backlight to the display panel, the touch sensor unit is disposed on the light emitting unit and electrically connected to the control circuit.

Wherein the light emitting unit including a first FPC and a light source, the first FPC is in a T shape and includes a horizontal portion and a vertical portion, the horizontal portion includes a first surface and a second surface, the touch sensor unit is disposed on the first surface, the light emitting unit is disposed on the second surface.

Wherein the mobile apparatus further including a backlight plate, the horizontal portion is adhesion to the backlight plate and makes the first FPC and the backlight plate is relatively fixed.

Wherein the mobile apparatus further including a second FPC, the second FPC is relatively fixed to the display panel, the second FPC is connected to the vertical portion, a peripheral circuits is disposed on the second FPC, and the peripheral circuits is electrically connected to the control circuit.

Wherein the mobile apparatus further including an integrated circuit, the integrated circuit and the display panel is relatively fixed, an input terminal of the integrated circuit is electrically connected to the peripheral circuit, an output terminal of the integrated circuit is electrically connected to the display panel.

The advantage of the present application is: comparing to the conventional technology, the present application is disposing the touch sensor unit on the light-emitting unit and electrically connected to the control circuit, so that the mobile apparatus does not need to additional provide a FPC need to be adhesive to the cover plate to dispose the touch sensor unit, to save the cost and eliminate the adhesion process.

BRIEF DESCRIPTION OF THE DRAWINGS

In order to more clearly illustrate the embodiments of the present application or prior art, the following figures will be described in the embodiments are briefly introduced. It is obvious that the drawings are merely some embodiments of the present application, those of ordinary skill in this field can obtain other figures according to these figures without paying the premise.

DETAILED DESCRIPTION OF PREFERRED EMBODIMENTS

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of ordinary skill in the premise of no creative efforts obtained should be considered within the scope of protection of the present application.

Specifically, the terminologies in the embodiments of the present application are merely for describing the purpose of the certain embodiment, but not to limit the invention. Examples and the claims be implemented in the present application requires the use of the singular form of the book "an", "the" and "the" are intend to include most forms unless the context clearly dictates otherwise. It should also be understood that the terminology used herein that "and/or" means and includes any or all possible combinations of one or more of the associated listed items.

Figure 1:
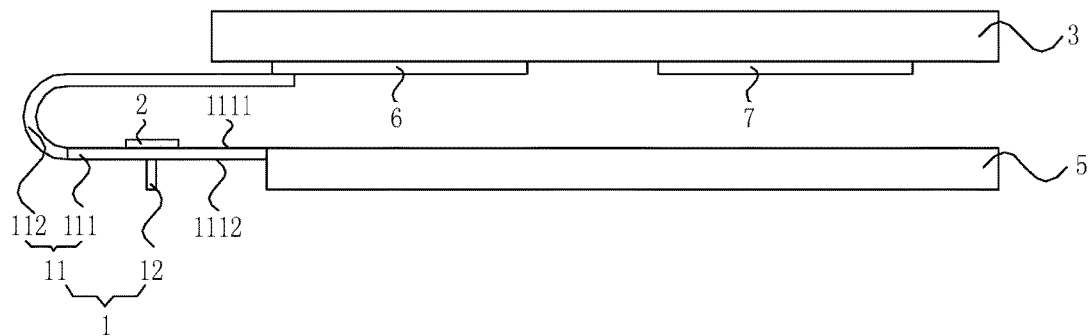
FIG. 1 is a cross-sectional schematic view of a mobile apparatus according to the embodiment of the present application.
Figure 3:
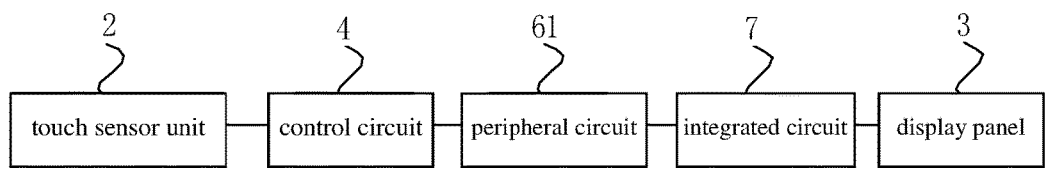
FIG. 3 is a schematic diagram of a circuit in the mobile apparatus.

Referring to FIG. 1, the present application provides a mobile apparatus, the apparatus includes: a light emitting unit 1, a touch sensor unit 2, a display panel 3, a control circuit 4 (Referring to FIG. 3, not shown in FIG. 1).

Figure 2:
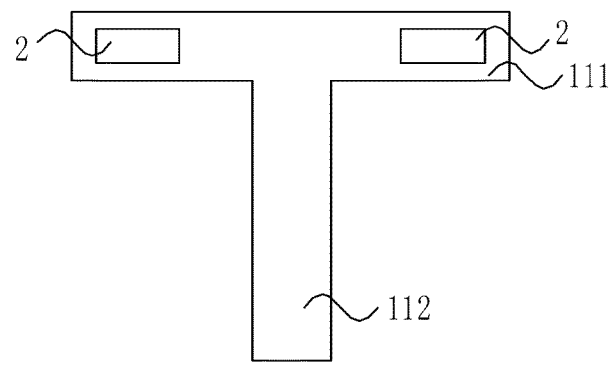
FIG. 2 is a planar schematic structure of the first FPC illustrated in FIG. 1.

Combining referring to FIGS. 1 and 2, the light emitting unit 1 includes a first FPC 11 and a light source 12, the plane structure of the first FPC 11 showed a "T" shape, that includes a horizontal portion 111 and a vertical portion 112. The horizontal portion 111 includes a first surface 1111 and a second surface 1112, specifically, the first surface 1111 is the upper surface of the horizontal portion 111, the second surface 1112 is the lower surface of the horizontal portion 111, the touch sensor unit 2 is disposed on the first surface 1111, the light emitting unit 12 is disposed on the second surface 1112.

Wherein the touch sensor unit 2 is disposed on the first surface 1111 by the methods including but not limited to welding, adhesion, the number of the touch sensor unit 2 is according to the actual needs, the number is taken two in the schematic diagram of the present embodiment; the light source 12 can include but not limited to emitting chips of LED chips, and is disposed on the second surface 1112 by the methods including but not limited to welding or adhesion.

Wherein the first FPC 11 has a circuit traces formed on and is electrically connected to the light source 12 for making the light source 12 emitting light.

Further referring to FIG. 1, the present embodiment further includes a backlight plate 5, the side for emitting light of the light source 12 is faced to the backlight plate 5, so that the backlight plate 5 can provide the backlight with high uniformity to the display panel 3, wherein the backlight plate 5 is located below the display panel 3; the horizontal portion 111 of the first FPC 11 is adhesive to a side of the backlight plate 5 closed to the light source 12 and makes the horizontal portion 111 and the backlight plate 5 is relatively fixed, the way of the adhesive can be performed by a tape.

Further, the present embodiment further includes a second FPC 6, and the second FPC 6 is relatively fixed to the display panel 3, specifically, the second FPC 6 is relatively fixed to a side of the display panel 3 closed to the backlight plate 5; the second FPC 6 is connected to the vertical portion 112 of the first FPC 11, specifically, the second FPC 6 is connected to an end of the vertical portion 112 remote to the horizontal portion 111, since the display panel 3 is above the backlight plate 5, after the connecting, makes the vertical portion 112 of the first FPC 11 is bent upwardly and the cross-sectional view of the first FPC 11 is a U-shape as illustrated in FIG. 1; a peripheral circuits 61 is disposed on the second FPC 6 (referring to FIG. 3, not shown in FIG. 1).

Wherein, the connection way of the second FPC 6 and the vertical section 112 can be welding.

In addition, the control circuit 4 and the first FPC 11 are relatively fixed, and is connected through the vertical portion 112 of the first FPC 11 to the second FPC 6.

As illustrated in FIG. 1, the present embodiment further includes an integrated circuit 7, the integrated circuit 7 and the display panel 3 is relatively fixed, specifically, the integrated circuit 7 is relatively fixed to a side of the display panel 3 closed to the backlight plate 5.

As illustrated in FIG. 3, FIG. 3 is a schematic diagram of a circuit in the mobile apparatus.

Specifically, the touch sensor unit 2 is electrically connected to the control circuit 4, the control circuit 4 is electrically connected to the peripheral circuit 61, an input terminal of the integrated circuit 7 is electrically connected to the peripheral circuit 61, an output terminal of the integrated circuit 3 is electrically connected to the display panel 3.

Figure 4:
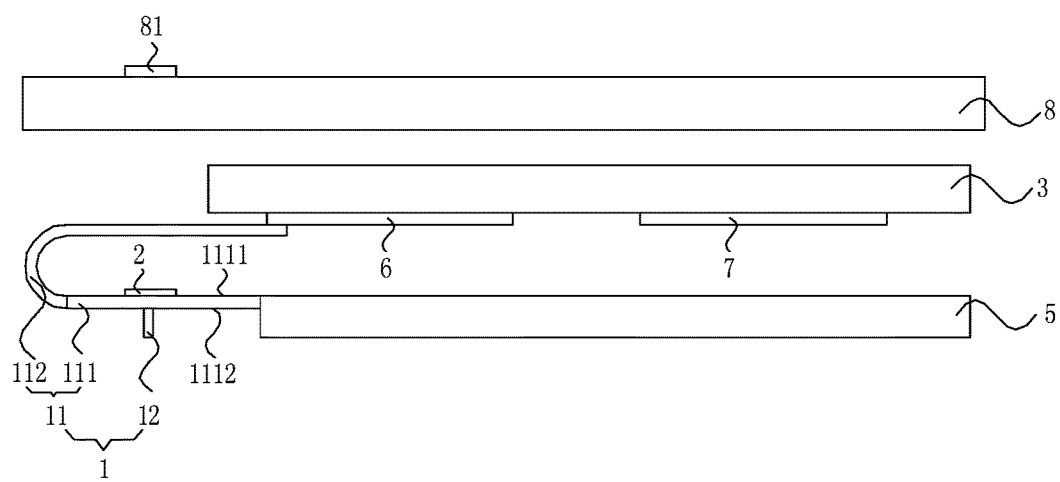
FIG. 4 is a cross-sectional schematic view of the embodiment with cover plate illustrated in FIG. 1.

As illustrated in FIG. 4, FIG. 4 is a cross-sectional schematic view of the embodiment with cover plate illustrated in FIG. 1.

Wherein the cover plate 8 is disposed above the display panel 3, a touch pattern 81 is disposed on the cover plate 8, the position of the touch pattern 81 is corresponding to that of the touch sensor unit 2 vertically and with the same numbers, the number is taken two in the schematic diagram of the present embodiment.

In particular, during use of the mobile apparatus of the present application, the integrated circuit 7 generates a voltage, and is transmitted to the touch sensor unit 2 by the peripheral circuit 61 electrically connected thereto and the control circuit electrically connected to the peripheral circuit 61, and making the touch sensor unit 2 generating an electrical capacity, when the touch pattern 81 on the cover plate 8, is touched by human, a capacitance is formed between the human skin and the touch sensor unit 2, the capacitance makes the volumes of the original capacitance of the touch sensor unit 2 changed, thus the electricity or the charging time of the touch sensor unit 2 is further changed and generate a variation data, the data is transmitted to the integrated circuit 7 by the control circuit 4 electrically connected to the touch sensor unit 2 and the peripheral circuit 61 electrically connected to the control circuit 4, the integrated circuit 7 take an appropriate adjustments based on the data, and then react to the display panel 3 through an output terminal, thereby completing the process of a touch sensing process.

Comparing to the conventional technology, the present application is disposing the touch sensor unit 2 on the light-emitting unit 1 and electrically connected to the peripheral circuit 61 through the control circuit 4, so that the mobile apparatus does not need to additional provide a FPC need to be adhesive to the cover plate to dispose the touch sensor unit, to save the cost and eliminate the adhesion process.

Above are embodiments of the present application, which does not limit the scope of the present application. Any modifications, equivalent replacements or improvements within the spirit and principles of the embodiment described above should be cover plated by the protected scope of the invention.

What is claimed is:

1. A mobile apparatus, comprising:
a light emitting unit, a touch sensor unit, a display panel and a control circuit;
wherein the light emitting unit providing backlight to the display panel, the touch sensor unit is disposed on the light emitting unit and electrically connected to the control circuit;
the light emitting unit comprising a first FPC and a light source, the first FPC is in a T shape and includes a horizontal portion and a vertical portion, the horizontal portion includes a first surface and a second surface, the touch sensor unit is disposed on the first surface, the light emitting unit is disposed on the second surface;
a backlight plate, the horizontal portion is adhesion to the backlight plate and makes the first FPC and the backlight plate is relatively fixed;
a second FPC, the second FPC is relatively fixed to the display panel, the second FPC is connected to the vertical portion, a peripheral circuits is disposed on the second FPC, and the peripheral circuits is electrically connected to the control circuit.

2. The mobile apparatus according to claim 1, wherein the mobile apparatus further comprising an integrated circuit, the integrated circuit and the display panel is relatively fixed, an input terminal of the integrated circuit is electrically connected to the peripheral circuit, an output terminal of the integrated circuit is electrically connected to the display panel.

3. A mobile apparatus, comprising:
   a light emitting unit, a touch sensor unit, a display panel and a control circuit;
   wherein the light emitting unit providing backlight to the display panel, the touch sensor unit is disposed on the light emitting unit and electrically connected to the control circuit; and
   wherein the light emitting unit comprising a first FPC and a light source, the first FPC is in a T shape and includes a horizontal portion and a vertical portion, the horizontal portion includes a first surface and a second surface, the touch sensor unit is disposed on the first surface, the light emitting unit is disposed on the second surface.

4. The mobile apparatus according to claim 3, wherein the mobile apparatus further comprising a backlight plate, the horizontal portion is adhesion to the backlight plate and makes the first FPC and the backlight plate is relatively fixed.

5. The mobile apparatus according to claim 3, wherein the mobile apparatus further comprising a second FPC, the second FPC is relatively fixed to the display panel, the second FPC is connected to the vertical portion, a peripheral circuits is disposed on the second FPC, and the peripheral circuits is electrically connected to the control circuit.

6. The mobile apparatus according to claim 5, wherein the mobile apparatus further comprising an integrated circuit, the integrated circuit and the display panel is relatively fixed, an input terminal of the integrated circuit is electrically connected to the peripheral circuit, an output terminal of the integrated circuit is electrically connected to the display panel.

* * * * *